J. JANSKY.
ATTACHMENT FOR STALK CUTTERS.
APPLICATION FILED MAR. 29, 1917.
1,249,103.
Patented Dec. 4, 1917.
2 SHEETS—SHEET 1.
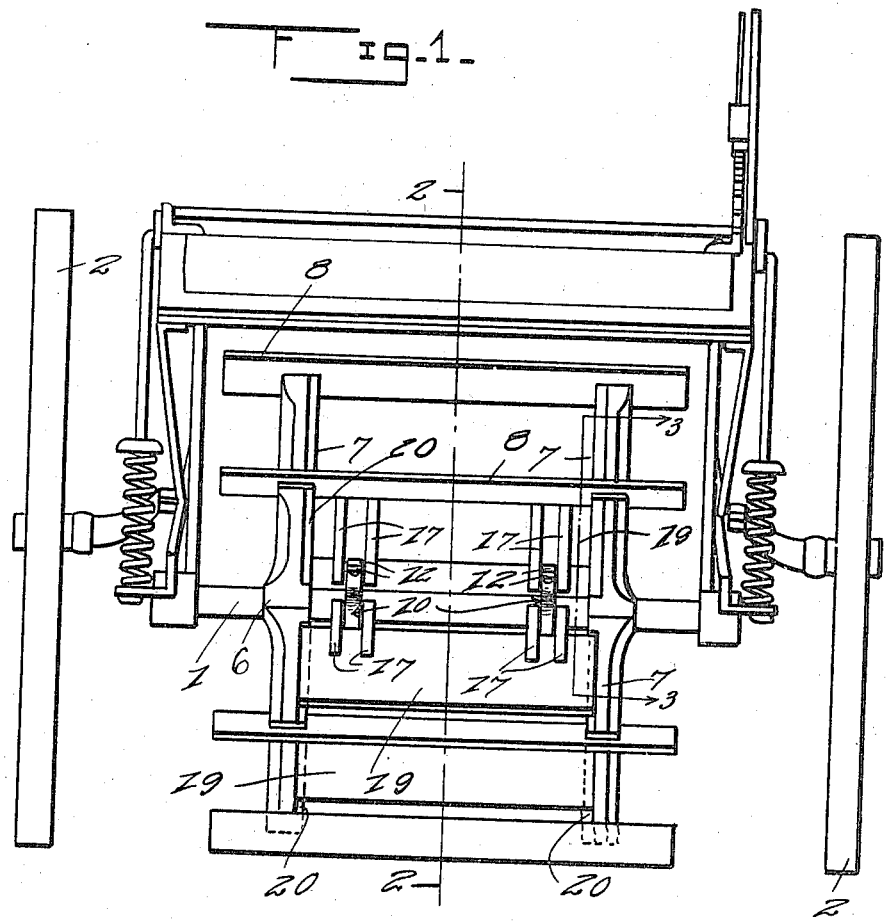
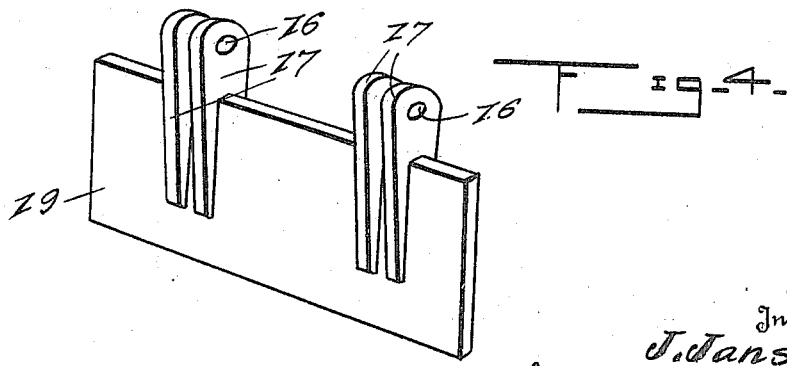

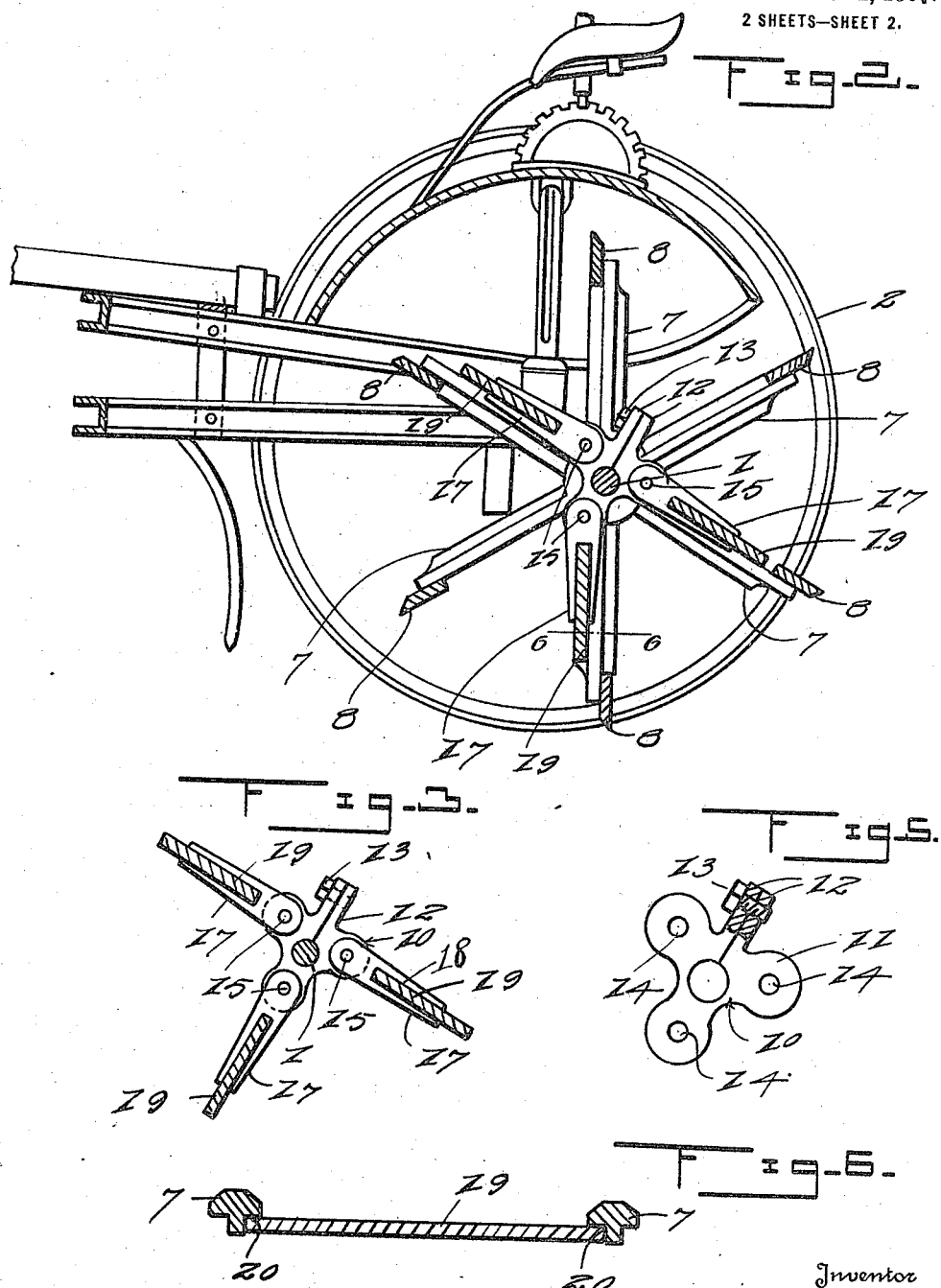

UNITED STATES PATENT OFFICE.

JOHN JANSKY, OF GANADO, TEXAS.

ATTACHMENT FOR STALK-CUTTERS.

1,249,103.  Specification of Letters Patent.  Patented Dec. 4, 1917.

Application filed March 29, 1917. Serial No. 158,352.

*To all whom it may concern:*

Be it known that I, JOHN JANSKY, a citizen of the United States, residing a Ganado, in the county of Jackson and State of Texas, have invented certain new and useful Improvements in Attachments for Stalk-Cutters; and I do hereby declare the following to be a full, clear, and exact description of the invention, such as will enable others skilled in the art to which it appertains to make and use the same.

This invention relates to an attachment for stalk cutters, and the primary object of the invention is to provide an attachment, which will prevent corn stalks, after they have been cut, from clogging the cutter.

An object of this invention is to provide a plurality of plates which are hingedly supported by the cutter carrying axle of a stalk cutter, so that during the rotation of the stalk cutter, the plates will move between the supporting arms of the blades of the stalk cutter for knocking stalks therefrom, and preventing the clogging of the cutter.

With the foregoing and other objects in view, this invention consists in such novel features of construction, combination and arrangement of parts as will be hereinafter more fully described, illustrated in the accompanying drawings, and claimed.

In describing the invention in detail reference will be had to the accompanying drawings wherein like characters designate like and corresponding parts throughout the several views, and in which:—

Figure 1 is a rear elevation of the stalk cutter showing the attachment applied thereto;

Fig. 2 is a section on the line 2—2 of Fig. 1;

Fig. 3 is a section on the line 3—3 of Fig. 1;

Fig. 4 is a detail perspective of one of the pivotally mounted plates;

Fig. 5 is a side elevation, showing parts in section of the member employed for connecting the plates to the axle; and Fig. 6 is a section on the line 6—6 of Fig. 2.

Referring more particularly to the drawings, 1 designates the chopper carrying shaft or axle of the stalk cutter. The rotary stalk cutter generically indicated by the numeral 3 is mounted upon the axle for rotation therewith, and it comprises end spiders 4 and 5, each of which comprise hub sections 6 having a plurality of radiating arms 7 formed thereon. The blades 8 of the stalk cutter are attached to the outer ends of the arms 7 as is ordinary in the construction of stalk cutters.

The axle 1 has a pair of members 10 removably mounted thereon. The members 10 comprise a plurality, preferably three ears 11, which are joined to the main body of the members, and a pair of parallel extending arms 12, which are formed by the splitting of the body so that the members 10 may be mounted upon or removed from the axle 1. The arms 12 are connected by the usual type of set screws 13 as clearly shown in Figs. 2 and 5 of the drawings.

The ears 11 are provided with openings 14 which receive bolts 15. The bolts 15 extend through openings 16 which are formed in the members 17. The members 17 are arranged in pairs, so that one will be positioned upon each side of each of the ears 11 as clearly shown in Fig. 1 of the drawings. The members 17 are provided with recesses 18 extending inwardly from their outer free ends, in which recesses extend the plates 19. Any suitable means may be provided for securing the members 17 to the plates 19, for pivotally connecting the plates to the members 10. The plates 19 extend from the spider 4 to the spider 5, as clearly shown in Fig. 1 of the drawings, and the arms 7 of the spiders are provided with cut-out portions 20 which form shoulders against which the ends of the plates 19 engage for limiting the pivotal movement of the plates.

During the rotation of the stalk cutter, the plates 19 will move or flap back and forth, between the arms of the spiders and prevent stalks from congregating between the arms or twisting about the blades, thereby keeping the stalk cutters clean and increasing the efficiency of its operation.

From the foregoing description taken in connection with the accompanying drawings, the advantages of construction and of the method of operation of the improved attachment for stalk cutters, will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. The combination with an ordinary stalk cutter including a rotary supporting axle and a rotary stalk cutting element carried by said axle, of a plurality of plates pivotally connected to said axle for movement within said rotary stalk cutting member for preventing the accumulation of stalks upon the rotary cutting member.

2. The combination with a stalk cutter including a supporting axle and a rotary cutter carried by said axle, of a plurality of members detachably mounted upon said axle, a plurality of blades pivotally connected to said members and adapted for limited pivotal movement upon rotation of said cutting element for preventing the accumulation of stalks upon the cutting element.

3. The combination with a stalk cutter including a supporting axle, a rotary cutting element including end spiders and blades carried by said spiders, of a plurality of members removably mounted upon said axle, a plurality of blades pivotally connected to said members for limited pivotal movement upon rotation of said rotary cutting element, said end spiders provided with recesses for receiving the ends of said blades for limiting the pivotal movement of the blades.

4. The combination with an ordinary stalk cutter including a rotary supporting axle and a rotary stalk cutting element carried by said axle, a plurality of pivotally mounted plates adapted for movement within said rotary stalk cutting members for preventing the accumulation of stalks upon the rotary cutter, and means for limiting the pivotal movement of said plates.

5. The combination with an ordinary stalk cutter including a rotary supporting axle and a rotary stalk cutting element carried by said axle, of a plurality of pivotally mounted plates positioned for movement within the rotary stalk cutting member for preventing the accumulation of stalks upon the rotary cutting member, and means formed upon said rotary cutting member for limiting the pivotal movement of said plates.

In testimony whereof I affix my signature in presence of two witnesses.

JOHN JANSKY.

Witnesses:
V. F. PARMA,
H. H. SAGEBIEL.

Copies of this patent may be obtained for five cents each, by addressing the "Commissioner of Patents, Washington, D. C."